(12) United States Patent
Oh et al.

(10) Patent No.: US 12,480,218 B2
(45) Date of Patent: Nov. 25, 2025

(54) BASIC ELECTROCATALYST FOR CARBON DIOXIDE REDUCTION AND ETHYLENE PRODUCTION, ELECTRODE AND APPARATUS EACH INCLUDING THE SAME, AND METHOD OF MANUFACTURING THE ELECTRODE

(71) Applicant: KOREA INSTITUTE OF SCIENCE AND TECHNOLOGY, Seoul (KR)

(72) Inventors: Hyung-Suk Oh, Seoul (KR); Byoung Koun Min, Seoul (KR); Yun Jeong Hwang, Seoul (KR); Ung Lee, Seoul (KR); Dong Ki Lee, Seoul (KR); Dahye Won, Seoul (KR); Woong Hee Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 662 days.

(21) Appl. No.: 16/869,600

(22) Filed: May 8, 2020

(65) Prior Publication Data
US 2020/0392632 A1    Dec. 17, 2020

(30) Foreign Application Priority Data
Jun. 12, 2019  (KR) .......................... 10-2019-0069562

(51) Int. Cl.
| | |
|---|---|
| *C25B 11/091* | (2021.01) |
| *B01J 23/04* | (2006.01) |
| *C25B 3/25* | (2021.01) |
| *C25B 3/26* | (2021.01) |
| *C25B 9/17* | (2021.01) |
| *C25B 11/031* | (2021.01) |
| *C25B 11/065* | (2021.01) |
| *C25B 1/16* | (2006.01) |
| *C25B 1/20* | (2006.01) |
| *C25B 1/34* | (2006.01) |

(52) U.S. Cl.
CPC ............. *C25B 11/091* (2021.01); *B01J 23/04* (2013.01); *C25B 3/25* (2021.01); *C25B 3/26* (2021.01);
(Continued)

(58) Field of Classification Search
CPC ..... C25B 3/25; C25B 3/26; C25B 9/17; C25B 11/031; C25B 11/052; C25B 11/091; B01J 23/04; B01J 23/72
See application file for complete search history.

(56) References Cited

U.S. PATENT DOCUMENTS

| 5,087,779 A * | 2/1992 | Nubel ..................... B01J 23/72 |
|---|---|---|
| | | 570/245 |
| 10,279,307 B2 | 5/2019 | Rayner et al. |
| (Continued) | | |

FOREIGN PATENT DOCUMENTS

| KR | 1020140104451 A | 8/2014 |
|---|---|---|
| KR | 1020160098505 A | 8/2016 |
| KR | 1020170065130 A | 6/2017 |

OTHER PUBLICATIONS

Go Iijima, Tomohiko Inomata, Hitoshi Yamaguchi, Miho Ito, and Hideki Masuda, Role of a Hydroxide Layer on Cu Electrodes in Electrochemical CO2 Reduction, ACS Catalysis Jun. 3, 2019 9 (7), 6305-6319 (Year: 2019).*

(Continued)

*Primary Examiner* — Luan V Van
*Assistant Examiner* — Mofoluwaso S Jebutu
(74) *Attorney, Agent, or Firm* — CANTOR COLBURN LLP

(57) ABSTRACT

Provided are a basic electrocatalyst applied to a carbon dioxide reduction and ethylene production system, a basic electrocatalyst electrode and an apparatus each including the same, and a method of manufacturing the basic electrocatalyst electrode. The basic electrocatalyst electrode for for carbon dioxide reduction and ethylene production includes: catalyst particles each including copper hydroxide ($Cu(OH)_2$); and a basic compound. Since the basic electrocatalyst electrode has high carbon dioxide reduction performance and high ethylene selectivity, the basic electrocatalyst electrode may be applied to a reduction electrode of a carbon dioxide reduction and ethylene production apparatus and may exhibit high current density and high ethylene selectivity. The basic electrocatalyst electrode may be manufac- (Continued)

tured by a simple method, and may be applied to a large-area electrode.

10 Claims, 18 Drawing Sheets

(52) U.S. Cl.
CPC .............. *C25B 9/17* (2021.01); *C25B 11/031* (2021.01); *C25B 11/065* (2021.01); *C25B 1/16* (2013.01); *C25B 1/20* (2013.01); *C25B 1/34* (2013.01)

(56) References Cited

U.S. PATENT DOCUMENTS

| | | | | |
|---|---|---|---|---|
| 2013/0168228 A1* | 7/2013 | Ozin | .......................... | C25B 3/25 977/773 |
| 2014/0332583 A1 | 11/2014 | Maeda | | |
| 2016/0376713 A1* | 12/2016 | Ono | .......................... | C25B 1/04 204/230.2 |
| 2021/0322958 A1* | 10/2021 | Huang | .................. | B01J 35/023 |

OTHER PUBLICATIONS

Shi Ruijuan, Wang Fei, Mu Xiaoling, Ta Na, Li Yong, Huang Xiumin, Shen Wenjie, Transfer Dehydrogenation of 1-Octanol to 1-Octanal over Cu/MgO Catalyst: Effect of Cu Particle Size, Chinese Journal of Catalysis, 2010, 31: 626-630. (Year: 2010).*

Jian Zhang, Hengyong Xu, Qingjie Ge and Wenzhao Li, Highly efficient Ru/MgO catalysts for NH3 decomposition: Synthesis, characterization and promoter effect, Catalysis Communications, vol. 7, Issue 3, Mar. 2006, pp. 148-152 (Year: 2006).*

Rosalba Passalacqua, Siglinda Parathoner, Gabriele Centi, Avik Halder, Eric C. Tyo, Bing Yang, Sönke Seifert and Stefan Vajda, Electrochemical behaviour of naked sub-nanometre sized copper clusters and effect of CO2, Catal. Sci. Technol., 2016, 6, 6977-6985 (Year: 2016).*

Kalyani Gupta, Marco Bersani and Jawwad A. Darr, Highly efficient electro-reduction of CO2 to formic acid by nano-copper, J. Mater. Chem. A, 2016, 4, 13786-13794 (Year: 2016).*

Cao-Thang Dinh et al., "CO2 electroreduction to ethylene via hydroxide-mediated copper catalysis at an abrupt Interface," Science, May 18, 2018, pp. 783-787, vol. 360.

* cited by examiner

BASIC ELECTROCATALYST FOR CARBON DIOXIDE REDUCTION AND ETHYLENE PRODUCTION, ELECTRODE AND APPARATUS EACH INCLUDING THE SAME, AND METHOD OF MANUFACTURING THE ELECTRODE

CROSS-REFERENCE TO RELATED APPLICATION

This application claims the benefit of Korean Patent Application No. 10-2019-0069562, filed on Jun. 12, 2019, in the Korean Intellectual Property Office, the disclosure of which is incorporated herein in its entirety by reference.

BACKGROUND

1. Field

One or more embodiments relate to a basic electrocatalyst capable of producing ethylene with high selectivity and high current through electrochemical reduction of carbon dioxide, an electrode and an apparatus each including the same, and a method of manufacturing the electrode.

2. Description of the Related Art

The usage of fossil fuels generates greenhouse gases such as carbon dioxide, thereby causing climate change including global warming. In this regard, the production of useful carbon compounds through electrochemical reduction of carbon dioxide has great significance as an alternative to reducing carbon dioxide and replacing petrochemical processes.

Currently, research on electrochemical reduction of carbon dioxide is being conducted based on the development of electrode materials, and electrode materials capable of efficiently producing carbon monoxide, formic acid, ethylene, ethanol, and the like are being developed. Ethylene is widely used as a basic raw material for synthesizing a polymer or the like. In the case of research on electrochemical reduction of carbon dioxide, research for converting ethylene using copper is being conducted.

In such research on electrochemical reduction of carbon dioxide, carbon dioxide is dissolved in a neutral solution to conduct electrochemical reduction, and the produced material is quantified to evaluate conversion efficiency and activity. However, when carbon dioxide is dissolved in water to conduct an experiment, there is a limit to current density due to the solubility limit of carbon dioxide, and thus the solubility limit of carbon dioxide needs to be overcome for practical commercialization.

Recently, in order to solve the above problem, research has been conducted to directly react carbon dioxide in a humidified gas. In the case of ethylene, the Sargent group of the University of Toronto reported that gaseous carbon dioxide exhibits high current density and high conversion efficiency when a high-concentration basic solution is present at the boundary of an electrode catalyst layer (Science 360 (2018) 783-787). Through the electrode structure, ethylene Faraday efficiency of 60% or more was exhibited, and ethylene partial current density of 300 mA cm$^{-2}$ or more was shown. Further, carbon nanoparticles and graphite were applied to the catalyst layer to induce stability in the KOH basic solution. As an electrolyte membrane, an anion exchange membrane was used, and in the case of an oxidation electrode, a water oxidation reaction was applied.

However, this structure is difficult to implement in a large-area system due to the difficulty of preparing an electrode layer, high cost and high corrosion resistance of a high-concentration basic electrolyte, and the difficulty of controlling the flow of $CO_2$ gas and electrolyte liquid, and is not easy to perform process control in the construction of an actual system.

Therefore, in order to overcome this problem and to mass-produce ethylene through electrochemical reduction of carbon dioxide, it is necessary to study system improvement, and it is necessary to develop an electrode having improved durability of Cu used as a catalyst, and a method of preparing the electrode.

SUMMARY

One or more embodiments provide a basic electrocatalyst that may be utilized in carbon dioxide conversion and ethylene production systems with high carbon dioxide reduction performance and high ethylene selectivity.

One or more embodiments provide an electrocatalyst electrode including the basic electrocatalyst for carbon dioxide conversion and ethylene production.

One or more embodiments provide a method of preparing the electrocatalyst electrode for carbon dioxide conversion and ethylene production.

One or more embodiments provide a carbon dioxide conversion and ethylene production apparatus including the electrocatalyst electrode.

Additional aspects will be set forth in part in the description which follows and, in part, will be apparent from the description, or may be learned by practice of the presented embodiments of the disclosure.

According to one or more embodiments, a basic electrocatalyst for carbon dioxide reduction and ethylene production includes:

catalyst particles each including copper hydroxide (Cu(OH)$_2$); and basic particles each including a basic compound.

According to one or more embodiments, a basic electrocatalyst electrode for carbon dioxide conversion and ethylene production includes: the basic electrocatalyst.

According to one or more embodiments, a method of manufacturing the basic electrocatalyst electrode for carbon dioxide conversion and ethylene production includes:

applying a mixed solution including a basic compound and copper particles onto a substrate; and heat-treating the substrate coated with the mixed solution to form a catalyst layer.

According to one or more embodiments, a carbon dioxide conversion and ethylene production apparatus includes: the basic electrocatalyst electrode.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 11A to 11D show the carbon dioxide reduction current density and ethylene conversion efficiency of various copper electrodes according to voltage, wherein FIGS. 11A to 11O show the carbon dioxide reduction current density of (a) the copper catalyst electrode of Comparative Example 1, (b) a copper (I) oxide ($Cu_2O$) catalyst electrode of Comparative Example 2, and (c) the basic electrocatalyst electrode (KOH+Cu metal treatment) of Example 1, and FIG. 11D shows the ethylene conversion efficiency of these electrodes according to voltage;

DETAILED DESCRIPTION

Figure 1:
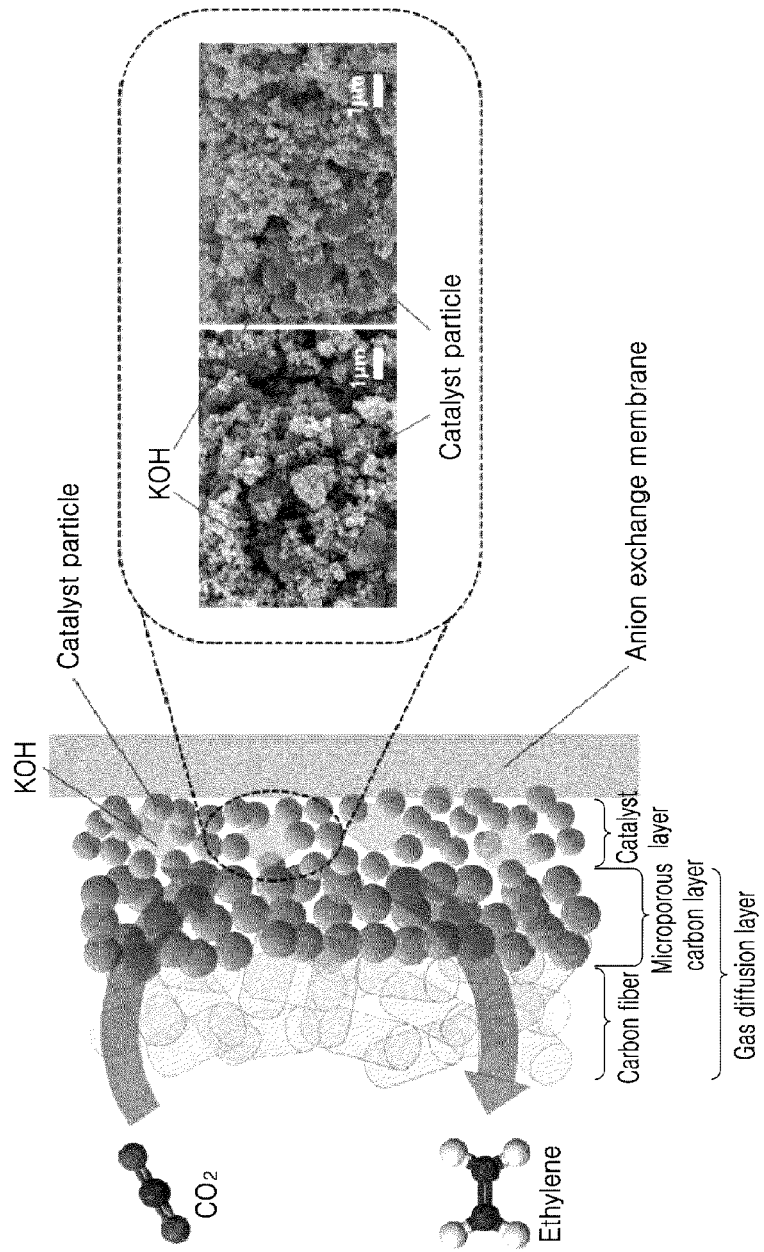
FIG. 1 shows a cross-sectional view of an electrocatalyst electrode including a basic electrocatalyst according to an embodiment, and a scanning electron microscope (SEM) image thereof.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present inventive concept will now be described more fully with reference to the accompanying drawings, in which example embodiments are shown. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. Throughout the written description and drawings, when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

Although the terms first, second, etc. may be used to describe various elements, components, areas, layers and/or regions, it will be understood that these elements, components, areas, layers and/or regions should not be limited by these terms.

In addition, the process described in the present disclosure does not necessarily mean to be applied in order. For example, it may be understood that, when a first step and a second step are described, the first step is not necessarily performed before the second step.

Hereinafter, a basic electrocatalyst capable of producing ethylene with high selectivity and high current through electrochemical reduction of carbon dioxide, an electrode including the same, a device including the same, and a method of manufacturing the electrode according to an embodiment will be described in detail with reference to the accompanying drawings.

A basic electrocatalyst for carbon dioxide reduction and ethylene production according to an embodiment includes:

catalyst particles each including copper hydroxide (Cu$(OH)_2$); and basic particles each including a basic compound.

The basic electrocatalyst includes catalyst particles and basic particles each including a basic compound, thereby improving current density during carbon dioxide conversion and ethylene production selectivity without using a high-concentration basic electrolyte. Further, the basic electrocatalyst may simplify the structure of an electrode for carbon dioxide reduction and ethylene production to facilitate the stacking of a system, and may greatly increase the capacity of a system of converting carbon dioxide into ethylene.

The basic particles include a basic compound, and are mixed with the catalyst particles in a solid form. The basic particles act to allow the electrocatalyst to have basicity. The basic electrocatalyst may form a solid electrode for carbon dioxide conversion and ethylene production that may convert gaseous carbon dioxide into ethylene without using a high-concentration basic electrolyte.

The basic compound may include at least one of metal hydroxides, for example, alkali metal hydroxides and alkali earth metal hydroxides. In an embodiment, the basic compound may include at least one selected from KOH, NaOH, LiOH, RbOH, CsOH, FrOH, $Be(OH)_2$, $Ca(OH)_2$, $Mg(OH)_2$, $Sr(OH)_2$, $Ba(OH)_2$, and $Ra(OH)_2$. For example, the basic compound may be an alkali metal hydroxide such as KOH, NaOH, LiOH, RbOH, CsOH, or FrOH. Specifically, for example, the basic compound may be KOH.

The basic particles may be distributed in the form of very small nanoparticles of about 10 nm or less. Alternatively, the basic particles may have a secondary particle form in which the nanoparticles are aggregated, a single particle form having an average particle size of about 0.01 µm to about 2 µm, or a mixed form thereof. For example, the basic particles may be mixed with the catalyst particles in the form of secondary particles in which nanoparticles are aggregated while small particles of several nanometers or less are present on the surface of the catalyst particles. The average particle diameter of the aggregated secondary particles may be about 0.05 µm to about 1.5 µm, for example, about 0.1 µm to about 1 µm. The basic particles are not limited thereto, and may be present in any form.

The content of the basic particles may be about 10 parts by weight to about 1000 parts by weight based on 100 parts by weight of the catalyst particles. In an embodiment, the content of the basic particles may be more than 10 parts by weight and 1000 parts by weight or less based on 100 parts by weight of the catalyst particles. For example, the content of the basic particles may be about 20 parts by weight to about 500 parts by weight or about 25 parts by weight to about 200 parts by weight based on 100 parts by weight of the catalyst particles. Within the above range, the basic particles may exhibit high current density while having high ethylene selectivity.

The catalyst particles include copper hydroxide ($Cu(OH)_2$). Copper hydroxide ($Cu(OH)_2$) acts to increase the selectivity of an ethylene reaction by leaving an OH functional group on the surface of a catalyst particle such as Cu during an actual reaction. Copper hydroxide may be formed by reaction of a copper component with a basic compound in the process of heat-treating a mixed solution including copper particles and a basic compound such as a metal hydroxide. Copper hydroxide is a novel ingredient that has not been used in conventional carbon dioxide reduction catalysts. In the case of manufacturing an electrocatalyst using only copper particles without using a basic compound such as a metal hydroxide in the above manufacturing process, Copper hydroxide is not formed.

In an embodiment, the catalyst particles may further include copper (II) oxide (CuO). Copper oxide (II) (CuO) may be formed by oxidizing a copper component by heat treatment in the above manufacturing process.

The catalyst particles may be made of copper hydroxide ($Cu(OH)2$) and copper (II) oxide (CuO). However, the catalyst particles may not contain a zero-valent copper metal component, or a monovalent copper (I) oxide ($Cu_2O$).

The catalyst particles may have a form in which nanoscale primary particles are aggregated. The catalyst particles may have a form in which the basic particles are dispersed among the nanoscale primary particles.

In an embodiment, each of the catalyst particles may further include at least one element selected from, K, Na, Li, Rb, Cs, Fr, Be, Ca, Mg, Sr, Ba, and Ra, the surface of the catalyst particle being coated or doped with the at least one element. For example, the element may be an alkali metal such as K, Na, Li, Rb, Cs, or Fr. The element applied or doped on the surface of the catalyst particle may have a hydroxide form. The element may contain a component the same as or different from the components constituting the basic compound of the basic particles. The element may be a component derived from a basic compound, and may contain the same component as that of a basic compound.

The basic electrocatalyst may have a nanoporous structure. The nanoporous structure may increase the carbon dioxide gas material transfer of the basic electrocatalyst.

An electrocatalyst electrode for carbon dioxide reduction and ethylene production according to an embodiment includes the above-described basic electrocatalyst.

The electrocatalyst electrode is capable of producing ethylene with high ethylene selectivity and high current density in a system for electrochemically reducing gaseous carbon dioxide.

FIG. 1 is a cross-sectional view of an electrocatalyst electrode including a basic electrocatalyst according to an embodiment and a scanning electron microscope (SEM) image thereof.

As shown in FIG. 1, the electrocatalyst electrode may include a gas diffusion layer, a catalyst layer including the basic electrocatalyst, and a membrane electrode assembly including an electrolyte membrane.

The gas diffusion layer may include a carbon fiber layer and a microporous carbon layer. The gas diffusion layer may improve the durability of the catalyst layer, and may diffuse gaseous carbon dioxide and transfer the gaseous carbon dioxide to the catalyst layer.

The catalyst layer includes the above-described basic electrocatalyst. The catalyst layer has a porous structure including catalyst particles including copper hydroxide ($Cu(OH)_2$) and basic particles including a basic compound.

The electrolyte membrane may be an anion exchange membrane.

A carbon dioxide reduction and ethylene production apparatus according to an embodiment includes the above-described basic electrocatalyst.

Figure 2:
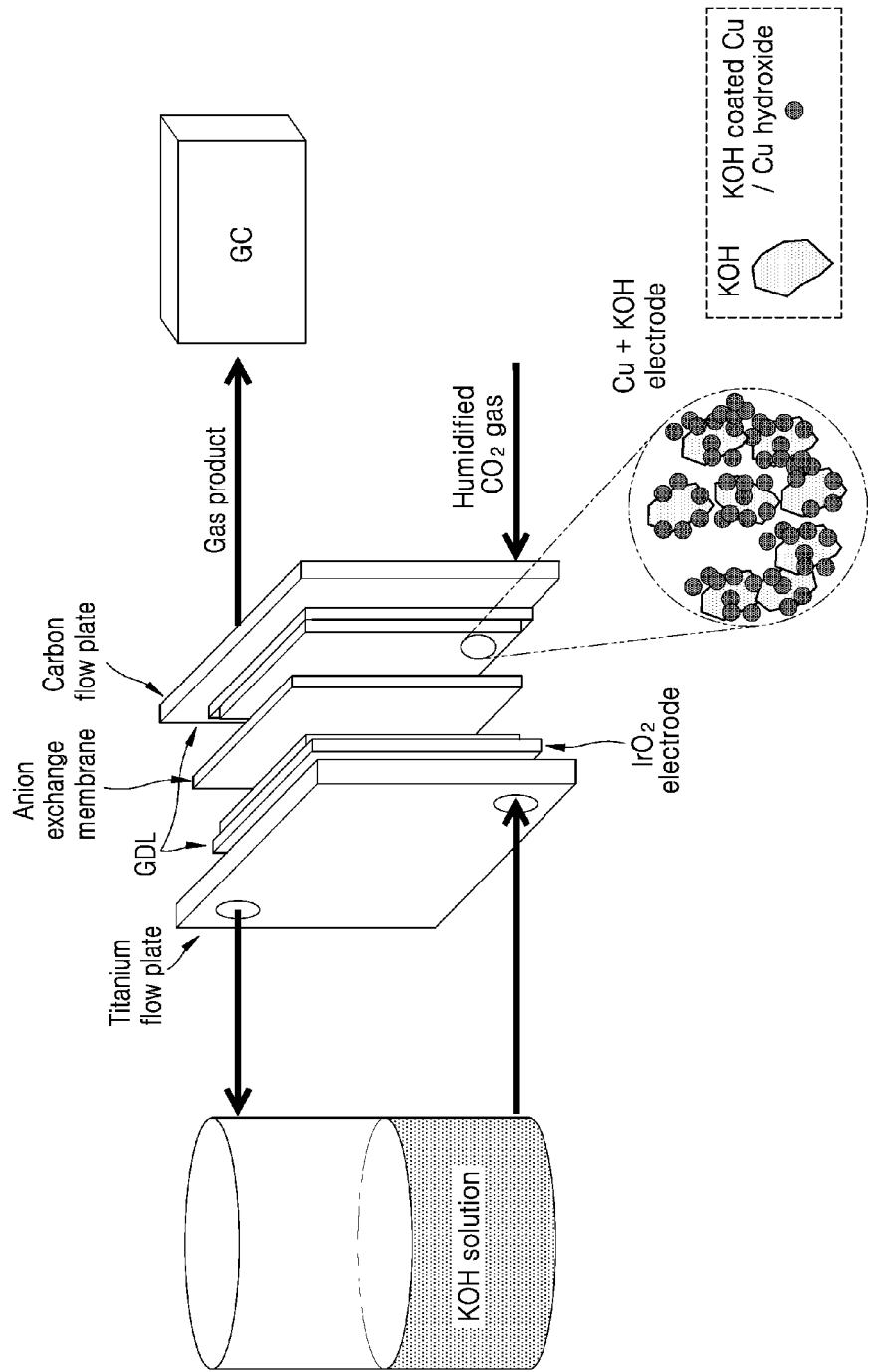
FIG. 2 is a schematic view of a carbon dioxide reduction-ethylene production system using a basic electrocatalyst electrode according to an embodiment.

FIG. 2 is a schematic view of a carbon dioxide reduction-ethylene production system using a basic electrocatalyst electrode according to an embodiment.

As shown in FIG. 2, in the carbon dioxide reduction and ethylene production apparatus, as an anode, a catalyst such as iridium oxide, which is advantage to an oxygen generation reaction, is applied onto the gas diffusion layer and then used. As a cathode, the basic electrocatalyst electrode is used. An electrolyte membrane for blocking the mixing of products produced from the anode and the cathode using an anion exchange membrane is formed between both the electrodes.

In the carbon dioxide reduction and ethylene production apparatus, a basic solution such as a KOH solution may flow toward the anode to perform an oxygen generation reaction through water electrolysis, and at the cathode, humidified carbon oxide gas may flow toward the cathode to produce ethylene through a carbon dioxide reduction reaction.

The carbon dioxide reduction and ethylene production apparatus may have high current density and high ethylene faraday efficiency by applying the basic electrocatalyst electrode according to an embodiment.

Figure 3:
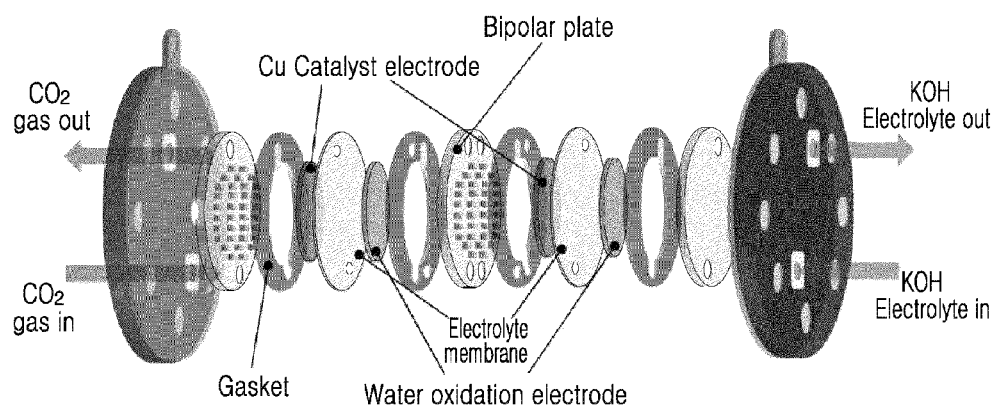
FIG. 3 is a schematic view of a stack system in which a basic electrocatalyst electrode according to an embodiment is introduced.

FIG. 3 is a schematic view of a stack system in which a basic electrocatalyst electrode according to an embodiment is introduced. Humidified carbon dioxide gas is supplied to a reduction electrode layer, and a basic electrolyte solution is supplied to a water oxidation electrode. Liquid and gas between the both electrodes are separated by an electrolyte membrane, and a material of one phase is supplied to each of the electrodes, so that a system is simplified to facilitate the stacking as shown in FIG. 3. Further, the concentration of carbon dioxide may be increased by the pressurization of the region of the reduction electrode to which gaseous carbon dioxide is supplied, thereby increasing reduction reactivity.

Hereinafter, a method of manufacturing the basic electrocatalyst electrode for carbon dioxide reduction and ethylene production according to an embodiment will be described.

The method of manufacturing the basic electrocatalyst electrode for carbon dioxide reduction and ethylene production includes:

applying a mixed solution including a basic compound and copper particles onto a substrate; and heat-treating the substrate coated with the mixed solution to form a catalyst layer.

The basic compound and the copper particles form copper oxide or copper hydroxide in the mixed solution, and the copper oxide or the copper hydroxide is applied onto the substrate, and then a catalyst layer having a porous structure is formed by heat treatment. The catalyst layer having a porous structure may improve current density by easily supplying gaseous carbon dioxide, and may improve the performance of the carbon dioxide reduction and ethylene production apparatus by increasing the faraday efficiency of an ethylene reaction due to high basicity of the basic compound.

The basic compound may include at least one of metal hydroxides, for example, alkali metal hydroxides and alkali earth metal hydroxides. In an embodiment, the basic compound may include at least one selected from KOH, NaOH, LiOH, RbOH, CsOH, FrOH, $Be(OH)_2$, $Ca(OH)_2$, $Mg(OH)_2$, $Sr(OH)_2$, $Ba(OH)_2$, and $Ra(OH)_2$. For example, the basic compound may be an alkali metal hydroxide such as KOH, NaOH, LiOH, RbOH, CsOH, or FrOH. Specifically, for example, the basic compound may be KOH.

In an embodiment, the copper particles may include at least one selected from Cu, $Cu_2O$, CuO, and $Cu(OH)_2$. The copper particles may have an average particle diameter of about 1 nm to about 100 μm. Within the above range, it may be easy to form a porous catalyst layer containing nano-sized catalyst particles containing copper hydroxide ($Cu(OH)_2$).

In an embodiment, the copper particles may be supported on a carbon-based support. The carbon-based support may include at least one selected from carbon black, carbon nanotubes, graphene, carbon nanofibers, and graphitized carbon black.

The mixed solution can be obtained by mixing a basic compound and copper particles in a solvent such as alcohol using an ultrasonic pulverizer.

In an embodiment, the mixed solution may further include a halogen material. Since the halogen material is added, the catalytic activity of an electrode may increase, thereby further improving current density. The halogen material may include at least one selected from KI, KCl, NaCl, NaI, NaBr, and KBr.

The mixed solution may be applied onto the substrate and then heat-treated, thereby forming a catalyst layer including catalyst particles containing copper hydroxide ($Cu(OH)_2$) and basic particles containing a basic compound. Here, the substrate may be a gas diffusion layer. The mixed solution may be applied onto the gas diffusion layer using an airbrush or the like, and a heating vacuum device may be used to rapidly evaporate the solvent during heat treatment.

Figure 4:
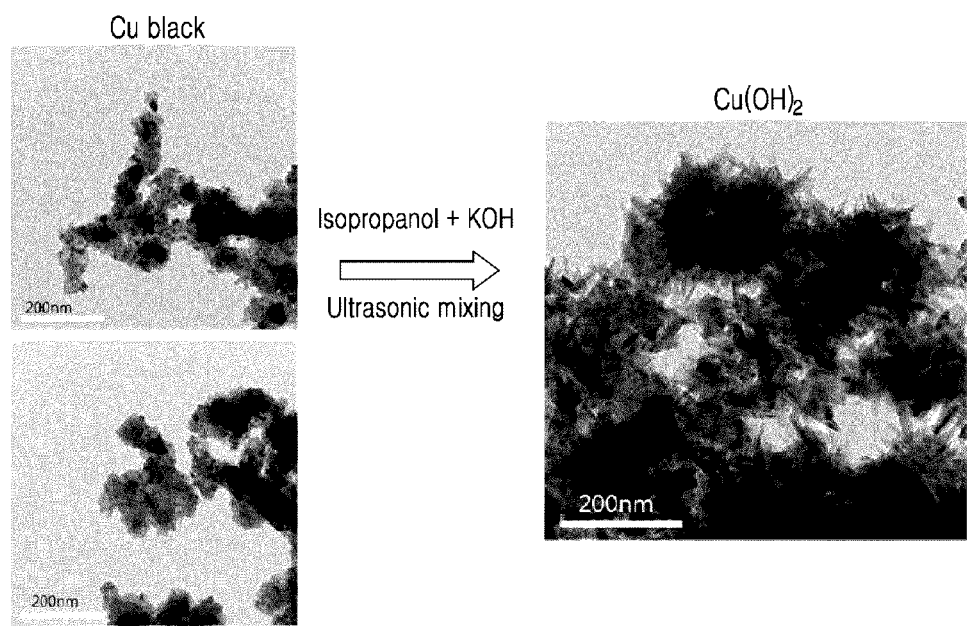
FIG. 4 shows scanning electron microscope images illustrating that a basic compound is introduced into copper particles to form copper hydroxide.

FIG. 4 shows the scanning electron microscope images illustrating that a basic compound is introduced into copper particles to form copper hydroxide. As shown in FIG. 4, copper black was mixed with isopropyl alcohol and KOH, which is a basic material, using an ultrasonic pulverizer to obtain a mixed ink, and then the mixed ink was observed by an electron microscope. As a result, it may be found that copper nanoparticles are modified in the form of copper hydroxide ($Cu(OH)_2$). Copper hydroxide is applied onto a substrate such as a gas diffusion layer together with a basic compound such as KOH.

When the mixed solution is applied onto a substrate and then heat-treated, a catalyst layer having a porous structure may be formed. Since the catalyst layer includes catalyst particles including copper hydroxide ($Cu(OH)_2$) and basic particles including a basic compound, the catalyst layer may have high carbon dioxide reduction performance and high ethylene selectivity, thereby providing a basic electrocatalyst electrode that may be utilized in a carbon dioxide conversion and ethylene production system.

Hereinafter, one or more embodiments will be described in more detail with reference to Examples and Comparative Examples below. However, these Examples and Comparative Examples are intended to illustrate technical ideas, and the scope of the present disclosure is not limited thereto.

EXAMPLE 1

Manufacture of Basic Electrocatalyst Electrode

An electrode including a basic electrocatalyst was manufactured as follows.

30 mg of copper nanoparticles (Sigma Aldrich, 774081) and 30 mg of KOH were mixed with 1 mL of an isopropyl alcohol (IPA) solvent. 30 mg of a 5 wt % Nafion solution (Sigma aldrich) dissolved in IPA as a binder and an ion exchange material was added to the mixed solution and then mixed using an ultrasonic pulverizer. The obtained solution is a solution in which copper nanoparticles are dispersed, and the copper nanoparticles have a hydrate form.

The obtained solution was applied onto a microporous layer (MPL, Sigracet, 39BC), which is a gas diffusion layer, and then heated to 90 □C to rapidly evaporate the solvent to form an electrode layer including a basic electrocatalyst.

EXAMPLE 2

Manufacture of Electrocatalyst Electrode having Different Basicity

An electrocatalyst electrode was manufactured in the same manner as in Example, except that the content of KOH, which is a basic material, was changed to 10 parts by weight, 25 parts by weight, and 50 parts by weight based on 100 parts by weight of copper nanoparticles when forming an electrode in Example 1.

COMPARATIVE EXAMPLE 1

Manufacture of Copper Catalyst Electrode

A copper catalyst electrode was manufactured in the same manner as in Example, except that only copper nanoparticles were used without using KOH, which is a basic material, in Example 1.

COMPARATIVE EXAMPLE 2

Manufacture of Copper (I) Oxide Catalyst Electrode

A copper oxide (I) catalyst electrode was manufactured in the same manner as in Comparative Example, except that copper (I) oxide ($Cu_2O$) nanoparticles were used instead of copper nanoparticles in Comparative Example 1.

COMPARATIVE EXAMPLE 3

Manufacture of Copper (II) Oxide Catalyst Electrode

A copper (II) oxide catalyst electrode was manufactured in the same manner as in Comparative Example, except that copper (II) oxide (CuO) nanoparticles were used instead of copper nanoparticles in Comparative Example 1.

EVALUATION EXAMPLE 1

SEM and Element Analysis Results of Electrocatalyst electrode

Scanning electron microscope (SEM) photographs of the copper catalyst electrode manufactured in Comparative Example 1 and the basic electrocatalyst electrode manufactured in Example 1 are shown in FIGS. 5A to 5C and FIGS. 6A to 6C, respectively.

Figure 5A:
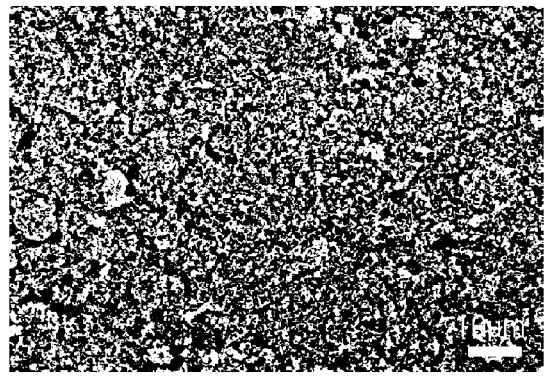
FIGS. 5A, 5B, and 5C show scanning electron microscope (SEM) images of a copper catalyst electrode manufactured in Comparative Example 1.
Figure 5B:
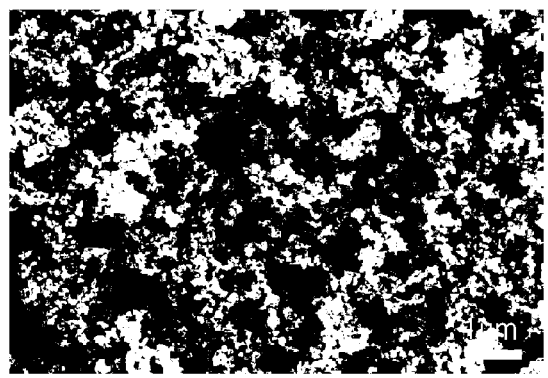
Figure 5C:
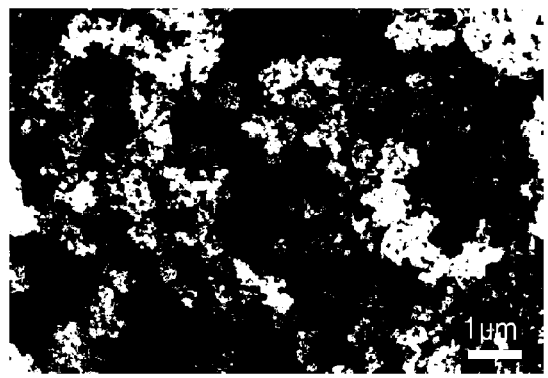

As shown in FIGS. 5A to 5C, it may be found that, in the copper catalyst electrode manufactured using only the copper nanoparticles in Comparative Example 1, porous nanoparticles were dispersed. It is expected that the copper catalyst electrode exhibits a high carbon dioxide gas material transfer rate because it has high porosity.

Figure 6A:
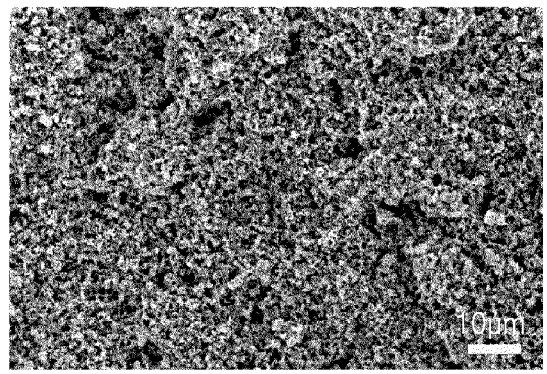
FIGS. 6A, 6B, and 6C show SEM images of a basic electrocatalyst electrode manufactured in Example 1.
Figure 6B:
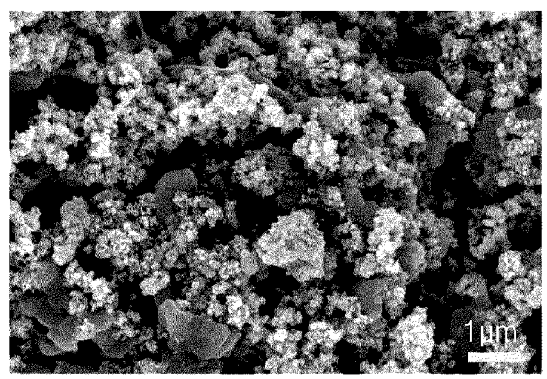
Figure 6C:
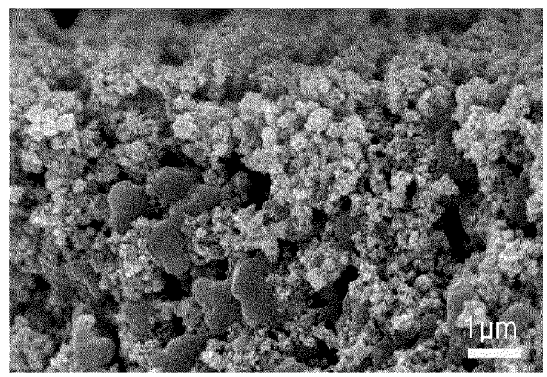

As shown in FIGS. 6A to 6C, it may be found that, even in the case of the basic electrocatalyst electrode manufactured by adding KOH, which is a basic material, in Example 1, aggregates of KOH particles were mixed between catalyst nanoparticles. It is expected that the basic electrocatalyst electrode also exhibits a high carbon dioxide gas material transfer rate because it has high porosity.

Figure 7:
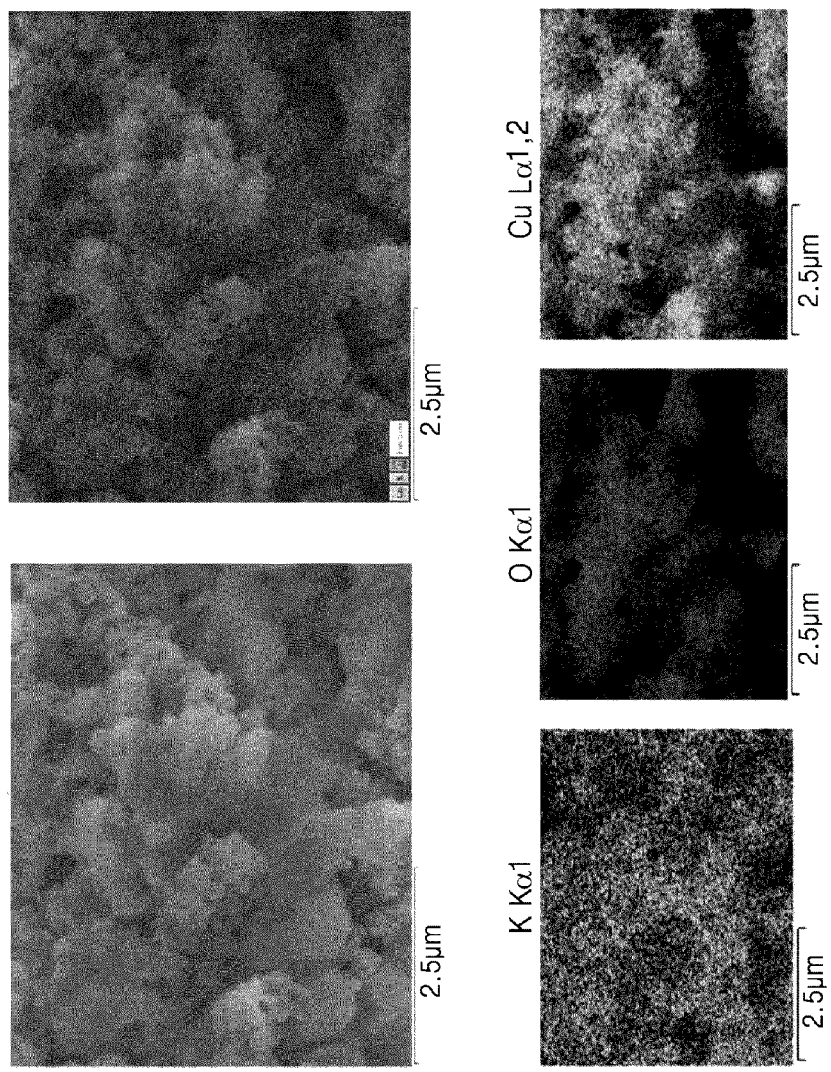
FIG. 7 shows EDX mapping results of the basic electrocatalyst electrode manufactured in Example 1.

SEM EDX mapping was performed to observe the distribution of KOH with respect to the basic electrocatalyst electrode manufactured in Example 1, and the results thereof are shown in FIG. 7. As shown in FIG. 7, it may be found that, observing the particle distribution of element K, the element K is evenly distributed on the electrocatalyst nanoparticles in addition to the KOH particles. Accordingly, it may be found that, in the case of the electrocatayst electrode of Example 1, electrocatalyst nanoparticles containing the element K and large-sized KOH particles are mixed in a coated or doped form.

EVALUATION EXAMPLE 2

XRD, XAENS, XPS Results of Basic Electrocatalyst Electrode

Figure 8:
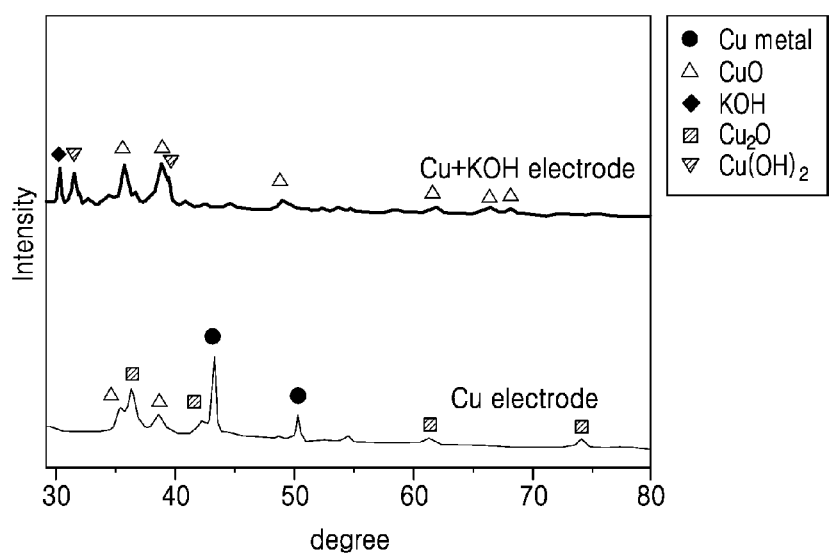
FIG. 8 illustrates X-ray diffraction (XRD) patterns observed for the basic electrocatalyst electrode manufactured in Example 1 and the copper catalyst electrode manufactured in Comparative Example 1.

X-ray diffraction (XRD) patterns were measured to observe the phase of the material in the copper catalyst electrode manufactured in Comparative Example 1 and the electrocatalyst electrode manufactured in Example 1, and the results thereof are shown in FIG. 8.

As shown in FIG. 8, it is found that the copper catalyst electrode manufactured using commercial copper nanoparticles in Comparative Example 1 has a structure in which zero-valent metallic copper, monovalent copper oxide ($Cu_2O$), and divalent copper oxide (CuO) are mixed. The reason for this is that the surface of the electrode layer was oxidized because the solution in which copper nanoparticles were dispersed was applied to a gas diffusion layer (GDL) and heated at a high temperature. However, metallic Cu is still observed, which means that the electrode is metallic Cu whose surface is oxidized into $Cu_2O$ or CuO.

In contrast, it may found that the basic electrocatalyst electrode of Example 1 does not have a metallic Cu peak, and there is an oxide mixed with CuO and $Cu(OH)_2$. Thus, it may be found that, in the basic electrocatalyst electrode, copper nanoparticles were changed to hydroxide and divalent copper oxide.

Figure 9:
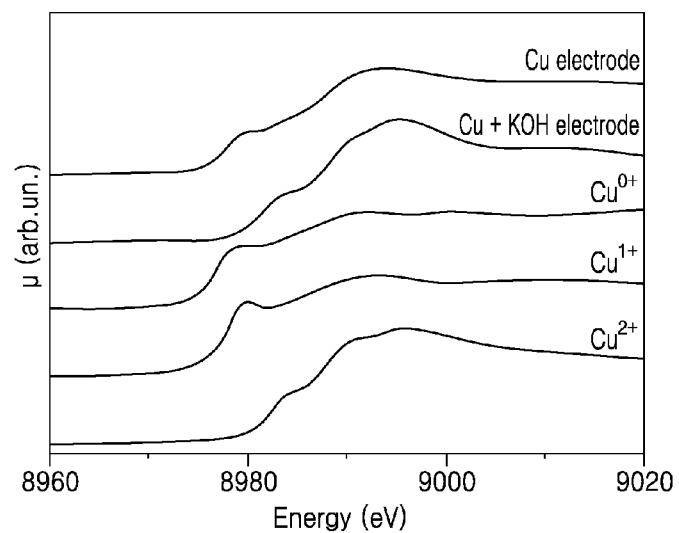
FIG. 9 illustrates X-ray absorption near-edge structure (XANES) patterns observed for the basic electrocatalyst electrode manufactured in Example 1 and the copper catalyst electrode manufactured in Comparative Example 1.

FIG. 9 illustrates the X-ray absorption near edge structure (XANES) patterns observed for the electrocatalyst electrode manufactured in Example 1 and the copper catalyst electrode manufactured in Comparative Example 1. XANES analysis is an easy method to know the state of a bulk material.

As shown in FIG. 9, the copper catalyst electrode manufactured in Comparative Example 1 shows a form in which $Cu^{0+}$, $Cu^{1+}$, and $Cu^{2+}$ are mixed, which is the same as the XRD pattern result. The basic electrocatalyst electrode manufactured in Example 1 shows almost a form of $Cu^{2+}$, which is also the same as the previous XRD pattern result.

Figure 10:
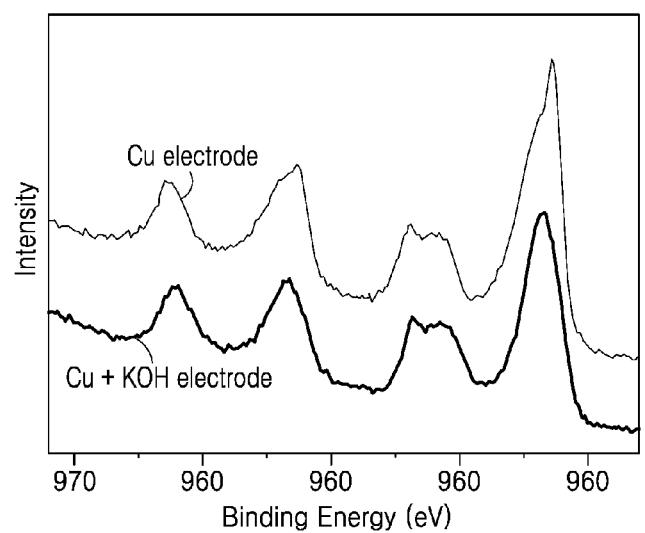
FIG. 10 illustrates X-ray photoelectron spectroscopy patterns of a copper element with respect to the basic electrocatalyst electrode manufactured in Example 1 and the copper catalyst electrode manufactured in Comparative Example 1.

FIG. 10 illustrates the X-ray photoelectron spectroscopy patterns of a copper element with respect to the copper catalyst electrode manufactured in Comparative Example 1 and the electrocatalyst electrode manufactured in Comparative Example 1. XPS is suitable to check the state of the surface of a material.

As shown in FIG. 10, it may be found that the copper catalyst electrode manufactured in Comparative Example 1 shows a form in which $Cu^{1+}$ and $Cu^{2+}$ were mixed, and thus the surface thereof was oxidized. Further, it may be found that the surface of the basic electrocatalyst electrode manufactured in Example 1 was completely changed.

EVALUATION EXAMPLE 3

Test result of Carbon Dioxide Conversion System of Electrocatalyst Electrode In order to evaluate the carbon dioxide conversion-ethylene production performance for the electrocatalyst electrode manufactured in Example 1 and the copper catalyst electrodes of Comparative Examples 1 and 2, the carbon dioxide reduction current density and ethylene conversion efficiency according to voltage were measured, and the results thereof are shown in FIGS. 11A to 11D. The measurement was conducted using the carbon dioxide reduction-ethylene production system shown in FIG. 2 in which each electrocatalyst electrode was introduced and the stack system shown in FIG. 3 in which each electrocatalyst electrode was introduced. As a basic membrane, an anion membrane (Sustainion® 37-50, Dioxide Co., Ltd.) was used, and as an oxygen generating catalyst, $IrO_2$ applied on a gas diffusion layer (GDL) was used. 1 M of KOH was flowed to the cathode, and 100 ccm of carbon dioxide humidified at 50° C. was flowed to the anode. A cell having a total area of 10 $cm^2$ was tested.

Figure 11A:
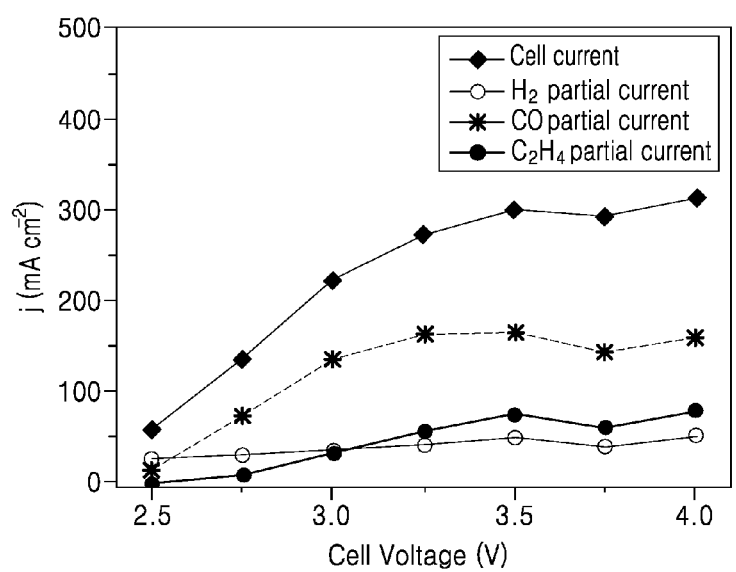
Figure 11B:
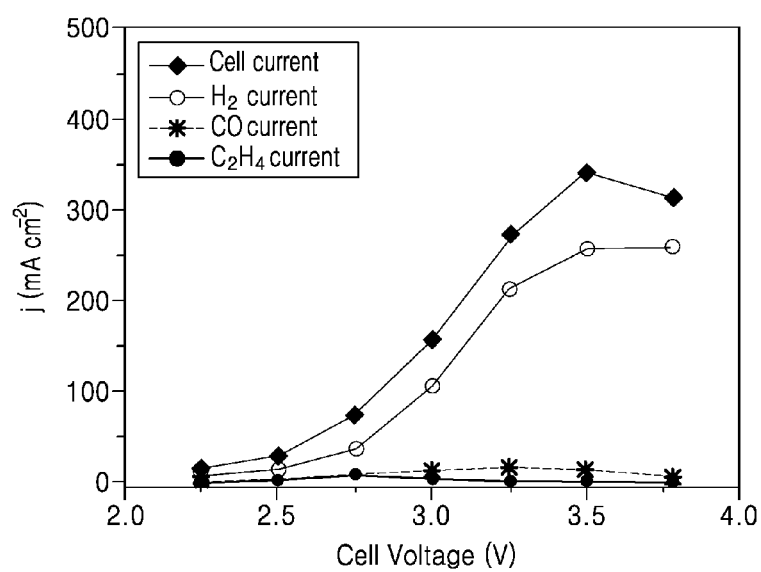
Figure 11C:
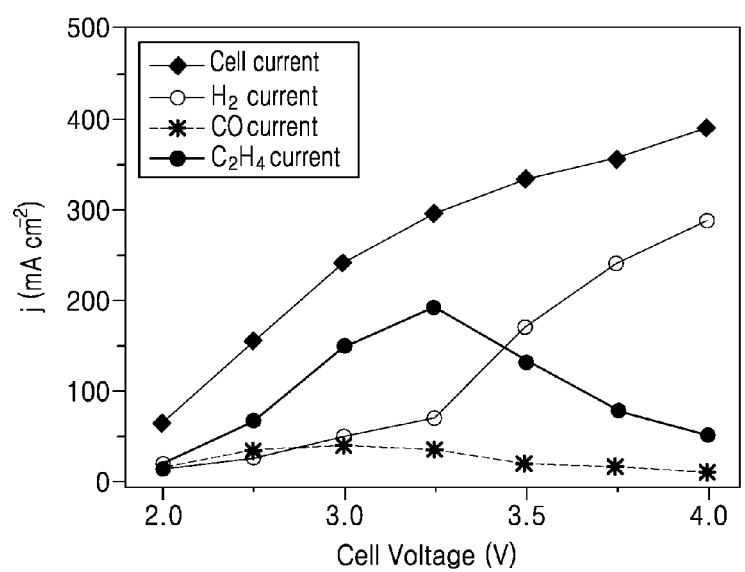
Figure 11D:
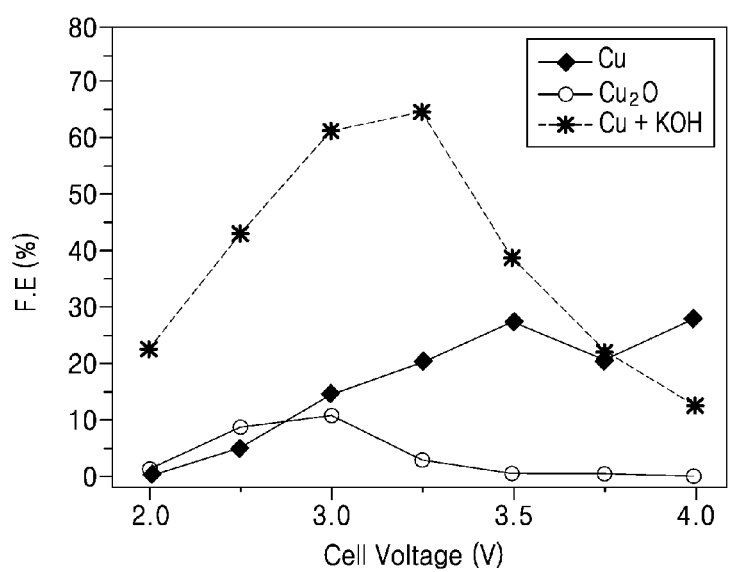
Figure 12A:
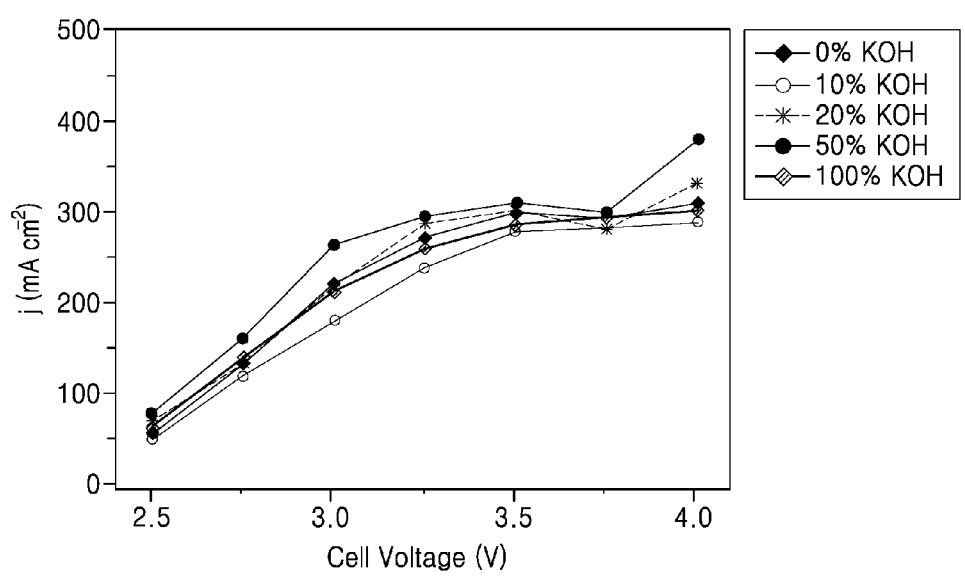
FIGS. 12A to 12D show (a) current density, (b) hydrogen partial current, (c) carbon monoxide partial current, and (d) ethylene partial current, according to the content of KOH, which is a basic substance, in the basic electrocatalyst electrode manufactured in Example 2, respectively.
Figure 12B:
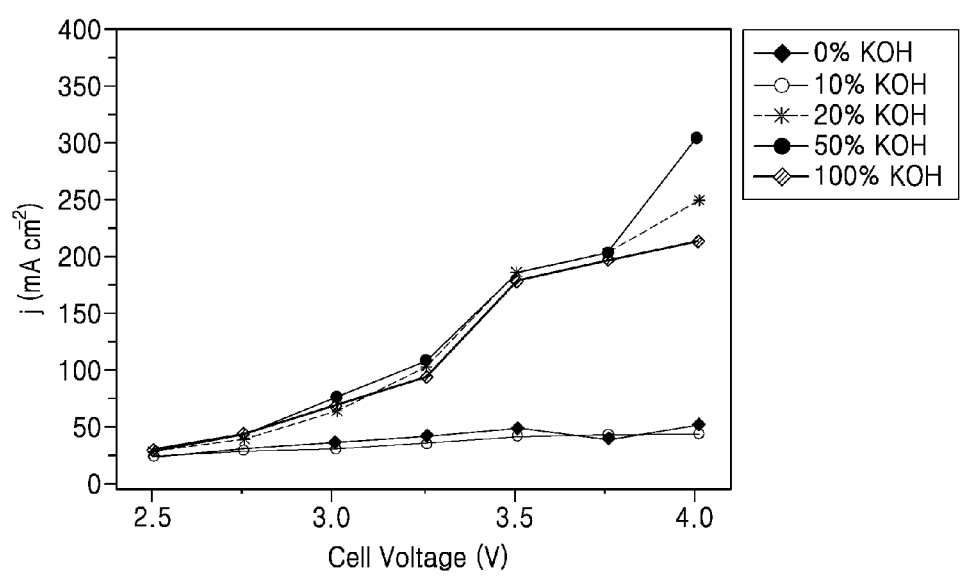
Figure 12C:
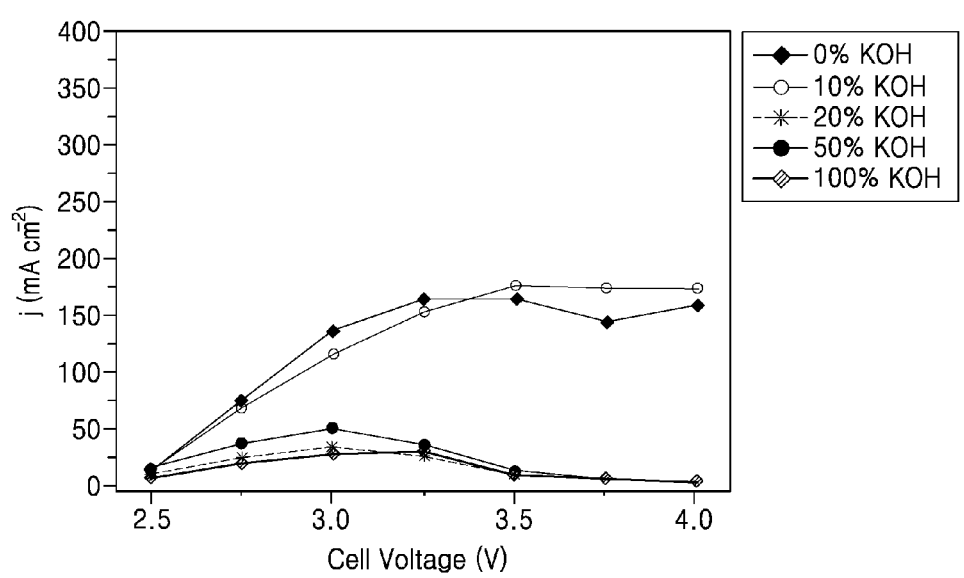
Figure 12D:
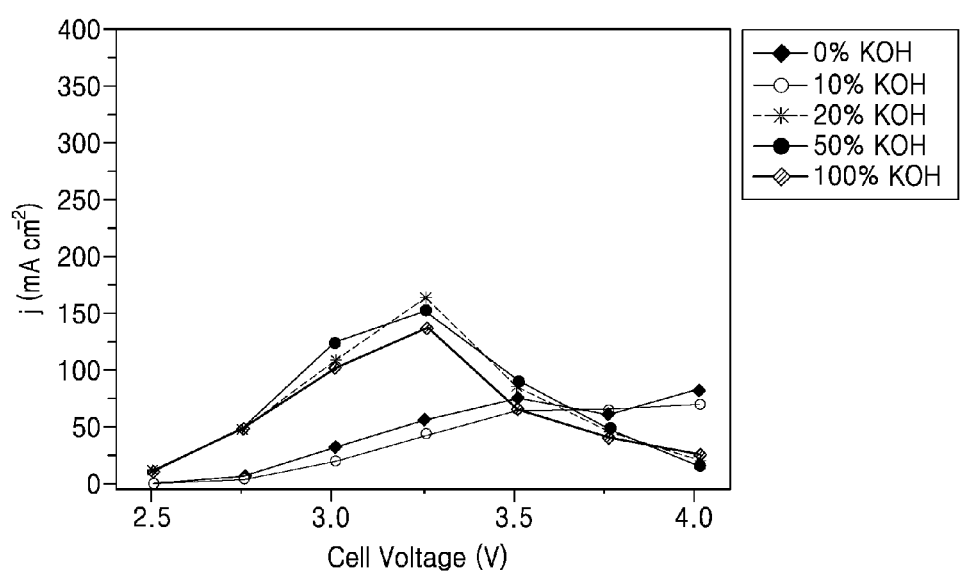

FIGS. 11A to 11C show the carbon dioxide reduction current density of (a) copper catalyst electrode of Comparative Example 1, (b) copper (I) oxide ($Cu_2O$) catalyst electrode of Comparative Example 2, and (c) basic electrocatalyst electrode (KOH+Cu metal treatment) of Example 1, and FIG. 11D shows the ethylene conversion efficiency of these electrodes according to voltage.

As shown in FIGS. 11A to 11C, it may be found that in the case of the copper catalyst electrode of Comparative Example 1, current density is high, but faraday efficiency of carbon monoxide was very high, and that In the case of the copper (I) oxide (Cu2O) electrode of Comparative Example 2, most of the current was used for hydrogen production. In contrast, in the case of the basic electrocatalyst electrode of Example 1, ethylene selectivity increased as the voltage increased from the cell voltage of 2.5 V, thereby showing a current density of 260 mAcm-2 or more and an ethylene selectivity of 60% or more at the cell voltage of 3.0 to 3.25 V. When the voltage became higher than the cell voltage of 3.25 V, the hydrogen partial current density increased rapidly.

FIG. 11D shows the ethylene conversion faraday efficiency (F.E) of each of the electrodes manufactured in Example 1 and Comparative Examples 1 and 2 according to voltage. As shown in FIG. 11D, the basic electrocatalyst electrode of Example 1 exhibited an ethylene conversion faraday efficiency of 60% or more, whereas the copper electrode of Comparative Example 1 and the copper (I) oxide ($Cu_2O$) electrode of Comparative Example 2 exhibited ethylene conversion efficiency lower than that of the basic electrocatalyst electrode of Example 1. This indicates that the basic material of the basic electrocatalyst electrode greatly influences ethylene selectivity.

For the effect of a basic material, basic electrocatalyst electrodes were manufactured by varying the content of KOH, which is a basic material, as in Example 2, and carbon dioxide conversion performance of each electrode was measured and shown in FIGS. 12A to 12D. FIGS. 12A to 12D shows the (a) current density, (b) hydrogen partial current, (c) carbon monoxide partial current, and (d) ethylene partial current according to the content of KOH, which is a basic material, respectively.

As shown in FIGS. 12A to 12D, all the basic electrocatalyst electrodes, regardless of the content of the basic material, have similarly high current densities. As may be found from the previous SEM results, this indicates that gaseous carbon dioxide phase may react well because it has a porous structure regardless of whether it is basic or not. When the content of the basic material is up to 10% with respect to the copper electrode, ethylene selectivity is the same as that of a general copper electrode, but when the content of the basic material exceeds 10%, the ethylene selectivity increases suddenly. This indicates that the ethylene efficiency is greatly increased when the copper electrode is basic due to the basic material. Therefore, it may be found that copper hydrate is formed due to basicity, and the electrode layer has high ethylene selectivity and high current density due to high basicity.

The basic electrocatalyst for carbon dioxide reduction and ethylene production according to an embodiment may be applied to a reduction electrode of a carbon dioxide conversion and ethylene production apparatus, and may exhibit high current density and high ethylene selectivity. The basic electrocatalyst electrode may be manufactured by a simple method, and may be applied to a large-area electrode.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An electrode for carbon dioxide reduction and ethylene production, the electrode comprising a basic electrocatalyst comprising:
   catalyst particles including copper hydroxide ($Cu(OH)_2$); and
   basic particles including a basic compound, wherein the basic particles have a nanoparticle form of 10 nm or less, a secondary particle form in which the nanoparticles of 10 nm or less form an aggregate, or a mixed form thereof;
   wherein the catalyst particles and the basic particles are supported on a microporous substrate,
   wherein the catalyst particles include little or no elemental copper as observed in an X-ray diffraction pattern of the catalyst particles, and
   wherein the basic compound includes at least one of KOH, NaOH, LiOH, RbOH, CsOH, FrOH, $Be(OH)_2$, $Ca(OH)_2$, $Mg(OH)_2$, $Sr(OH)_2$, $Ba(OH)_2$, or $Ra(OH)_2$.

2. The electrode of claim 1, wherein the microporous substrate is a carbon-based support.

3. The electrode of claim 2, wherein the carbon-based support includes at least one of carbon black, carbon nanotubes, graphene, carbon nanofibers, or graphitized carbon black.

4. The electrode of claim 1, further comprising a gas diffusion layer on the basic electrocatalyst catalyst.

5. The electrode of claim 1, wherein the catalyst particles further comprises copper(II)oxide, and a surface of the catalyst particles are coated or doped with at least one element of K, Na, Li, Rb, Cs, Fr, Be, Ca, Mg, Sr, Ba, or Ra, or the hydroxide of each element thereof.

6. The electrode of claim 1, wherein the basic electrocatalyst has a nanoporous structure.

7. The electrode of claim 1, wherein each of the catalyst particles has a form in which nanoscale primary particles are aggregated.

8. The electrode of claim 1, wherein an amount of the basic particles is about 10 parts by weight to about 1000 parts by weight based on 100 parts by weight of the catalyst particles.

9. A carbon dioxide reduction and ethylene production apparatus comprising: the basic electrocatalyst electrode of claim 1.

10. A method of manufacturing the basic electrocatalyst electrode of claim 1 for carbon dioxide reduction and ethylene production, the method comprising:
    applying a mixed solution including the basic compound and the catalyst particles including copper hydroxide onto the microporous substrate; and
    heat-treating the microporous substrate coated with the mixed solution to form a catalyst layer.

* * * * *